UNITED STATES PATENT OFFICE.

JESSE A. DUBBS, OF ALLEGHENY, PENNSYLVANIA.

PROCESS OF REFINING OILS.

SPECIFICATION forming part of Letters Patent No. 407,182, dated July 16, 1889.

Application filed December 3, 1888. Serial No. 292,507. (Specimens.)

*To all whom it may concern:*

Be it known that I, JESSE A. DUBBS, a citizen of the United States, residing at Allegheny, in the county of Allegheny and State of Pennsylvania, have invented or discovered certain new and useful Improvements in Refining Oils, of which improvements the following is a specification.

Petroleum found in the oil-fields adjacent to Lima, Ohio, commonly known as "Lima oil," is so impregnated with sulphur or its compounds as to be utterly unfit for use as an illuminant until entirely freed from sulphur. Many attempts have heretofore been made to free this oil from the sulphur either before, during, or after distillation; but such attempts have heretofore been practically unsuccessful.

The object of the invention herein is to provide for the removal of the sulphur from the crude oil during the distilling operation by forming a precipitate during the condensation of the vapors formed in the still; and in general terms the invention consists in the method hereinafter more fully described and claimed.

In the practice of my invention the crude oil is charged into a still of the usual or any suitable form or construction, and there subjected to the treatment customary in refining oil. Simultaneous with the charging of the still with the crude petroleum, or immediately thereafter, I place in the still a material capable of being volatilized when mingled with the oil and at the same temperature as the oil, and having a greater affinity for the sulphur or its compounds than that possessed by the oil. It is also a necessary characteristic of this material that it should be capable of or possess the capacity of forming when combined with the sulphur or its compounds a precipitate which shall be insoluble in the products derived from the condensation of the vapors of the still.

As the crude oil and the material charged therein, as above described, are subjected to heat both will give off a vapor, which commingling will pass into the condenser and there be condensed, the compound produced by the sulphurous vapors and the material charged into the oil being deposited as an insoluble precipitate in the condenser, and passes in such form with the oil on through to the receiving-tank, as in the usual refining operation.

Arsenium or its salts—such as the chloride or oxide—I have found to possess the qualities or characteristics hereinbefore set forth, and when employing it for refining the crude oil I charge about one pound of the arsenium or the salt into the still to every barrel of oil contained therein, such proportion, however, being modified in accordance with the percentage of sulphur present, such percentage differing considerably in the oil derived from different wells. The arsenical vapors as they are driven off by the heat to which the still is subjected combine with the sulphurous vapors in the volatilized oil and pass therewith into the condenser, where all the vapors derived from the still are condensed, the compound of arsenium and sulphur forming a precipitate—*e. g.*, realgar or orpiment—which is insoluble in the oil and which will settle in the distillate or receiving tank. It is essential that the arsenium or other material employed should be giving off its vapors under the action of the heat during the entire volatilizing process to which the oil is subjected, in order that arsenical vapors may be present at all times, so as to combine with the sulphur in the volatilized oil; and, further, it is necessary that such a quantity of arsenium or other material employed should be charged in such quantities into the still as to afford a constant supply of arsenical vapors preferably in excess of that absolutely necessary for combining with the sulphur of the oil, thereby insuring a removal of all the sulphur therefrom, as hereinbefore described.

While I believe that the sulphur will combine more readily and effectively with the arsenium or other material employed for desulphurizing the oil when both are in vaporous or gaseous condition, it is also true that the sulphur will combine with the arsenium or other material without the volatilization of either.

I claim herein as my invention—

As an improvement in the art of refining oils containing sulphur, the herein-described method, which consists in adding arsenium or its salts to the oil, subjecting the compound to a volatilizing-heat, and then condensing the vapors so produced, substantially as set forth.

In testimony whereof I have hereunto set my hand.

JESSE A. DUBBS.

Witnesses:
W. B. CORWIN,
DARWIN S. WOLCOTT.